US012226955B2

United States Patent
Shiraishi et al.

(10) Patent No.: US 12,226,955 B2
(45) Date of Patent: Feb. 18, 2025

(54) RESIN POWDER FOR THREE-DIMENSIONAL MOLDING, THREE-DIMENSIONAL MOLDED ARTICLE, AND METHOD FOR PRODUCING THREE-DIMENSIONAL MOLDED ARTICLE

(71) Applicant: ASPECT, INC., Tokyo (JP)

(72) Inventors: Masaharu Shiraishi, Yokohama (JP); Kenji Goto, Hachioji (JP); Masashi Hagiwara, Saitama (JP); Yusei Kimura, Kawasaki (JP)

(73) Assignee: ASPECT, INC., Tokyo (JP)

( * ) Notice: Subject to any disclaimer, the term of this patent is extended or adjusted under 35 U.S.C. 154(b) by 639 days.

(21) Appl. No.: 17/603,786

(22) PCT Filed: Apr. 14, 2020

(86) PCT No.: PCT/JP2020/016368
§ 371 (c)(1),
(2) Date: Oct. 14, 2021

(87) PCT Pub. No.: WO2020/213586
PCT Pub. Date: Oct. 22, 2020

(65) Prior Publication Data
US 2022/0219389 A1 Jul. 14, 2022

(30) Foreign Application Priority Data
Apr. 16, 2019 (JP) ................................ 2019-077902

(51) Int. Cl.
| | |
|---|---|
| B29C 64/153 | (2017.01) |
| B29C 64/268 | (2017.01) |
| B29K 23/00 | (2006.01) |
| B33Y 10/00 | (2015.01) |
| B33Y 70/00 | (2020.01) |
| B33Y 80/00 | (2015.01) |
| C08F 210/06 | (2006.01) |
| C08J 3/12 | (2006.01) |

(52) U.S. Cl.
CPC ......... *B29C 64/153* (2017.08); *B29C 64/268* (2017.08); *B33Y 10/00* (2014.12); *B33Y 70/00* (2014.12); *B33Y 80/00* (2014.12); *C08J 3/124* (2013.01); *B29K 2023/16* (2013.01); *B29K 2995/0094* (2013.01); *C08F 210/06* (2013.01); *C08J 2323/16* (2013.01)

(58) Field of Classification Search
CPC .... C08F 210/02; C08F 210/04; C08F 210/06; C08F 210/16; C08F 2500/27; C08F 2800/10; C08F 2500/24; B33Y 70/00; B29K 2023/16; B29K 2995/0094
See application file for complete search history.

(56) References Cited

U.S. PATENT DOCUMENTS

2020/0308401 A1* 10/2020 Frangov ................... C08J 3/128
2020/0392320 A1* 12/2020 Mohammadi .......... B33Y 80/00

FOREIGN PATENT DOCUMENTS

| CN | 107304270 A | 10/2017 | |
|---|---|---|---|
| EP | 2411202 B1 * | 5/2017 | |
| JP | 6402810 B1 | 12/2018 | |
| JP | 2019-001154 A | 1/2019 | |
| WO | 2016/068899 A1 | 5/2016 | |
| WO | 2018/041839 A1 | 3/2018 | |
| WO | 2018/077854 A1 | 5/2018 | |
| WO | WO-2019096805 A1 * | 5/2019 | ........... B29C 64/153 |

OTHER PUBLICATIONS

CN107304270 machine translation (Year: 2024).*
https://formlabs.com/blog/polypropylene-3d-printing/ (Year: 2024).*
EPO, Extended European Search Report for the corresponding European application No. 20791226.2, dated May 6, 2022.
PCT, International Search Report for the corresponding application No. PCT/JP2020/016368, dated Jul. 7, 2020, with English translation.
PCT, Written Opinion of ISA for the corresponding application No. PCT/JP2020/016368, dated Jul. 7, 2020, with English translation.
JPO, Japanese Office Action mailed Apr. 16, 2024 for the related Japanese application No. 2021-514156, with English translation, 8 pages.

* cited by examiner

*Primary Examiner* — John M Cooney
*Assistant Examiner* — Jeffrey S Lenihan
(74) *Attorney, Agent, or Firm* — LUCAS & MERCANTI, LLP

(57) ABSTRACT

A resin powder for three-dimensional molding includes ethylene-propylene copolymer particles. The volume average particle size of the ethylene-propylene copolymer particles is within a range of 5 to 200 μm. The ethylene content molar ratio (ethylene/(ethylene+propylene)) in the ethylene-propylene copolymer particles is within a range of 0.001 to 0.04. The melt flow rate (MFR) is within a range of 3 to 40 g/10 min at 230° C.

5 Claims, 2 Drawing Sheets ately easily producing three-dimensional molded articles having a complicated shape. As one of methods for producing a three-dimensional molded article, a powder bed fusion method (PBF method) is known. The powder bed fusion method is characterized by high molding accuracy, and high adhesive strength between stacked layers. Thus, the powder bed fusion method can be used not only for production of a trial product for examining the shape or properties of a final product but also for production of a final product.

RESIN POWDER FOR THREE-DIMENSIONAL MOLDING, THREE-DIMENSIONAL MOLDED ARTICLE, AND METHOD FOR PRODUCING THREE-DIMENSIONAL MOLDED ARTICLE

CROSS REFERENCE TO RELATED APPLICATION

This Application is a 371 of PCT/JP2020/016368 filed on Apr. 14, 2020, which claims priority of Japanese patent application no. 2019-077902 filed on Apr. 16, 2019, and the above applications are incorporated herein by reference.

TECHNICAL FIELD

The present invention relates to a resin powder for three-dimensional molding, a three-dimensional molded article, and a method for producing a three-dimensional molded article, and particularly to a resin powder for three-dimensional molding which includes a polypropylene resin and has good tensile strength and excellent breaking elongation, and the like.

BACKGROUND ART

In recent years, various methods have been developed which are capable of relatively easily producing three-dimensional molded articles having a complicated shape. As one of methods for producing a three-dimensional molded article, a powder bed fusion method (PBF method) is known. The powder bed fusion method is characterized by high molding accuracy, and high adhesive strength between stacked layers. Thus, the powder bed fusion method can be used not only for production of a trial product for examining the shape or properties of a final product but also for production of a final product.

In the powder bed fusion method, a powder material containing resin material or metallic material particles is flatly laid to form a thin film, and desired locations on the thin film are irradiated with laser to selectively sinter or melt the particles contained in the powder material, so that the particles are bonded (hereinafter, bonding of particles by sintering or melting is also referred to simply as "fusion") to form one of layers obtained by finely dividing a three-dimensional molded article in a thickness direction (hereinafter, also referred to simply as a "molded article layer"). On the thus-formed layer, a powder material is further laid, and irradiated with laser, so that the particles contained in the powder material are selectively fused to forma next molded article layer. This procedure is repeated, so that molded article layers are stacked to produce a three-dimensional molded article having a desired shape.

For the particles contained in the powder material, a resin material such as polyamide may be used from the viewpoint of ease of handling and width of targets of application.

In particular, polyamide 12 can be suitably used because it has a relatively low melting point among polyamides, a small heat shrinkage ratio, and a low water-absorbing property among polyamides (see, for example, Patent Literature 1).

In recent years, however, demand for the use of molded articles as final products in addition to trial products have come to grow, and in particular, there has been an increasing desire to use a polypropylene having characteristic breaking elongation of resin.

CITATION LIST

Patent Literature

[Patent Literature 1] JP 6402810B

SUMMARY OF INVENTION

Technical Problem

The present invention has been made in view of the above-described problems and circumstances, and an object of the present invention is to provide a resin powder for three-dimensional molding which includes a polypropylene resin and has good tensile strength and excellent breaking elongation, a three-dimensional molded article, and a method for producing a three-dimensional molded article.

Solution to Problem

In the process of conducting studies on causes of the above-described problems for achieving the above-described object, the present inventors have found that by setting the volume average particle size, the ethylene content molar ratio and the melt flow rate within specific ranges in ethylene-propylene copolymer particles, there can be provided a resin powder for three-dimensional molding which has good tensile strength and excellent breaking elongation and includes a polypropylene resin, and the like and reached the present invention.

Specifically, the above-described object according to the present invention is achieved by the following.

1. A resin powder for three-dimensional molding, comprising ethylene-propylene copolymer particles, wherein
   the volume average particle size of the ethylene-propylene copolymer particles is within a range of 5 to 200 µm,
   the ethylene content molar ratio (ethylene/(ethylene+propylene)) in the ethylene-propylene copolymer particles is within a range of 0.001 to 0.04, and
   the melt flow rate (MFR) is within a range of 3 to 40 g/10 min at 230° C.
2. The resin powder for three-dimensional molding according to the first item, wherein the melting point is within a range of 100 to 160° C. and satisfies the relationship of expression (1):

$$(\text{melting point temperature} - \text{recrystallization temperature}) \geq 10° C. \quad \text{expression (1):}$$

3. The resin powder for three-dimensional molding according to the first or second item, wherein the number of particles having an average particle size 0.15 times the number average particle size (Mn) of the ethylene-propylene copolymer particles is equal to or more than the number of the particles having the number average particle size (Mn).
4. The resin powder for three-dimensional molding according to any one of the first to third items, wherein the number of particles having an average particle size 0.41 times the number average particle size (Mn) of the ethylene-propylene copolymer particles is equal to or more than the number of the particles having the number average particle size (Mn).
5. A three-dimensional molded article formed using a resin powder for three-dimensional molding.

the three-dimensional molded article being a sintered product or a molten product of the resin powder for three-dimensional molding according to any one of the first to fourth items.
6. A method for producing a three-dimensional molded article using a resin powder for three-dimensional molding, comprising
producing a three-dimensional molded article by a powder bed fusion method using the resin powder for three-dimensional molding according to any one of the first to fourth items.
7. The method for producing a three-dimensional molded article according to the sixth item, comprising the steps of:
forming a thin layer of the resin powder for three-dimensional molding.
selectively irradiating the formed thin layer with laser light to form a molded article layer in which resin particles contained in the resin powder for three-dimensional molding are sintered or fused; and
carrying out the step of forming a thin layer and the step of forming a molded article layer, in this order, multiple times to stack the molded article layers.

Advantageous Effects of Invention

According to the above-described means of the present invention, it is possible to provide a resin powder for three-dimensional molding which includes a polypropylene resin and has good tensile strength and excellent breaking elongation, a three-dimensional molded article, and a method for producing a three-dimensional molded article.

The expression mechanism or the action mechanism of the effect of the present invention has not become clear, and is presumed as follows.

Generally, in a crystalline resin, a force applied to crystal interfaces increases and the crystalline resin becomes more fragile as the crystal part becomes larger. Thus, for increasing stiffness while maintaining strength, it is necessary to distribute the force by finely dividing crystals to increase the number of interfaces, but it has been found that when the polypropylene resin is merely powdered, it is difficult to reduce the size as desired, so that sufficient strength and stiffness cannot be obtained.

Thus, in the process of conducting studies for solving the problem, it has been found that by copolymerizing ethylene with the propylene polymer, desired strength and stiffness can be obtained.

That is, in the resin powder for three-dimensional molding according to the present invention, ethylene-propylene copolymer particles are contained, and the ethylene content molar ratio, the volume average particle size and the melt flow rate in the ethylene-propylene copolymer particles are set within specific ranges, so that crystals can be finely divided, and as a result, it is possible to obtain a resin powder for three-dimensional molding which has good tensile strength and excellent breaking elongation and includes a polypropylene resin.

DESCRIPTION OF EMBODIMENTS

Figure 1:
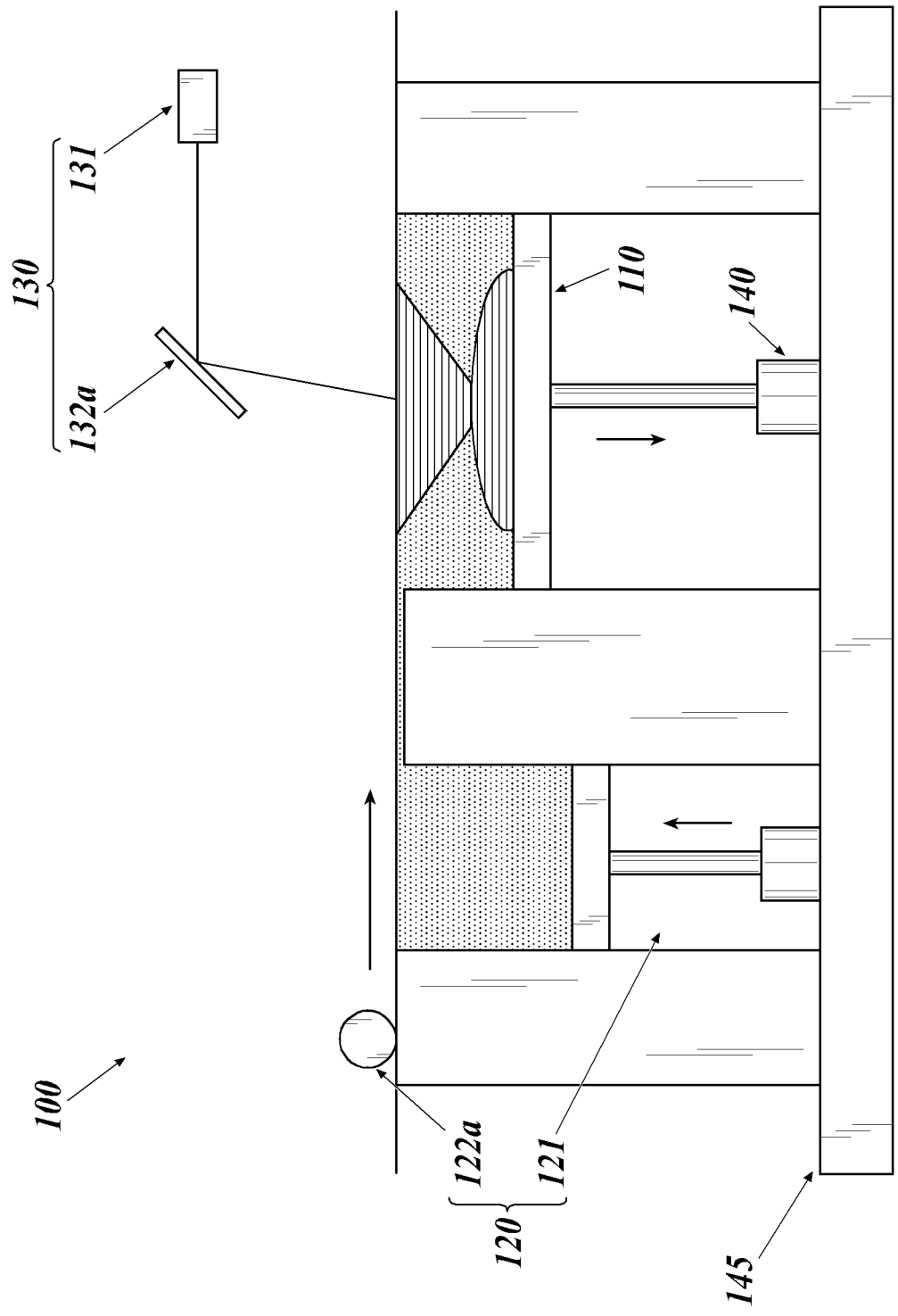
FIG. 1 is a side view schematically showing a configuration of a three-dimensional molding apparatus in an embodiment of the present invention.

A resin powder for three-dimensional molding according to the present invention contains ethylene-propylene copolymer particles, wherein the volume average particle size of the ethylene-propylene copolymer particles is within a range of 5 to 200 µm, the ethylene content molar ratio (ethylene/(ethylene+propylene)) in the ethylene-propylene copolymer particles is within a range of 0.001 to 0.04, and the melt flow rate (MFR) is within a range of 3 to 40 g/10 min at 230° C.

This feature is a technical feature which is shared by or corresponds to the following embodiments.

In embodiments of the present invention, a temperature range necessary for suppressing deformation of a molded article in a powder stacking molding method is such that the melting point is within a range of 100 to 160° C. and satisfies the relationship of expression (1) ((melting point temperature−recrystallization temperature)≥10° C.).

The number of particles having an average particle size 0.15 times the number average particle size (Mn) of the ethylene-propylene copolymer particles is preferably equal to or more than the number of the particles having the number average particle size (Mn) because the particles having an average particle size 0.15 times the number average particle size (Mn) are disposed between the particles having the number average particle size (Mn), crystals can be more finely divided, and it is possible to enhance stiffness while maintaining strength.

The number of particles having an average particle size 0.41 times the number average particle size (Mn) of the ethylene-propylene copolymer particles is preferably equal to or more than the number of the particles having the number average particle size (Mn) because the particles having an average particle size 0.41 times the number average particle size (Mn) are disposed between the particles having the number average particle size (Mn), crystals can be more finely divided, and it is possible to enhance stiffness while maintaining strength.

The three-dimensional molded article of the present invention is a three-dimensional molded article formed using a resin powder for three-dimensional molding, the three-dimensional molded article being a sintered product or a molten product of the resin powder for three dimensional molding. Accordingly, it is possible to obtain a three-dimensional molded article which has good tensile strength and excellent breaking elongation and substantially includes a polypropylene resin.

A method for producing a three-dimensional molded article according to the present invention comprises producing a three-dimensional molded article by a powder bed fusion method using the resin powder for three-dimensional molding.

The method for producing a three-dimensional molded article according to the present invention comprises the steps of: forming a thin layer of the resin powder for three-dimensional molding; selectively irradiating the formed thin layer with laser light to form a molded article layer in which resin particles contained in the resin powder for three-dimensional molding are sintered or fused; and carrying out the step of forming a thin layer and the step of forming a molded article layer, in this order, multiple times to stack the molded article layers. Accordingly, it is possible to obtain a three-dimensional molded article which has good tensile strength and excellent breaking elongation and substantially includes a polypropylene resin, and the three-dimensional molded article also has high molding accuracy, and high adhesive strength between stacked layers.

Hereinafter, the present invention, and constituent elements thereof, and modes and aspects for carrying out the present invention will be described. In the present application, symbol "~" is used in the sense of including values described before and after the symbol as a lower limit and an upper limit.

[Resin Powder for Three-Dimensional Molding According to the Present Invention]

A resin powder for three-dimensional molding according to the present invention contains ethylene-propylene copolymer particles, wherein the volume average particle size of the ethylene-propylene copolymer particles is within a range of 5 to 200 μm, the ethylene content molar ratio (ethylene/(ethylene+propylene)) in the ethylene-propylene copolymer particles is within a range of 0.001 to 0.04, and the melt flow rate (MRF) is within a range of 3 to 40 g/10 min at 230° C. The resin powder for three-dimensional molding according to the present invention may contain other types of resin particles as long as the effect of the present invention is not hindered.

[Ethylene-Propylene Copolymer Particles]
<Volume Average Particle Size>

The volume average particle size of the ethylene-propylene copolymer particles (hereinafter, also referred to as copolymer particles) according to the present invention is within a range of 5 to 200 μm. More preferably, the volume average particle size is within a range of 20 to 100 μm.

(Measurement Method)

The volume average particle size (Mv) of the ethylene-propylene copolymer particles is measured by a dry (air) method using a particle size distribution measuring apparatus (Microtrac MT 3300EXII manufactured by Microtrac-BEL Corp.), where a particle refractive index for each powder is used and a solvent is not used. The particle refractive index is set to 1.5. As a measurement procedure, 0.2 g of a surfactant (EMAL E-27C manufactured by Kao Corporation) and 30 mL of water are added to 0.1 g of the particles, and the mixture is subjected to ultrasonic dispersion for 10 minutes.

The volume average particle size of the ethylene-propylene copolymer particles can be adjusted by, for example, subjecting the ethylene-propylene copolymer particles to grinding treatment by a grinding method such as a mechanical grinding method or a wet grinding method, or treatment for sphering particles.

<Ethylene Content Molar Ratio>

The ethylene content molar ratio (ethylene/(ethylene+propylene)) in the ethylene-propylene copolymer panicles is within a range of 0.001 to 0.04, more preferably within a range of 0.05 to 0.03.

As means for setting the ethylene content molar ratio within the above-described range, control can be performed by adjusting a gas composition (ethylene content molar ratio) in a gas-phase polymerization device during synthesis of the copolymer particles as described later.

(Measurement Method)

As a method for measuring the ethylene content molar ratio in the copolymer particles, 100 mg of a sample being the copolymer particles is added to mixed liquid of heavy benzene and heavy o-dichlorobenzene (heavy benzene/heavy o-dichlorobenzene=3/1), and dissolved at 120° C., followed by performing $^{13}$C-NMR measurement (quantitative mode) at 120° C.

Measuring apparatus: JEOL ECZ 400
    Measurement frequency: 13C 100 MHz
    Pulse condition: X_90_width=11.76 μs
    Cumulated number 1024

<Melt Flow Rate>

The melt flow rate (MFR) of the resin powder for three-dimensional molding according to the present invention is within a range of 3 to 40 g/10 min at 230° C., more preferably within a range of 5 to 35 g/10 min.

(Measurement Method)

The melt flow rate is a value measured under the conditions of 230° C. and a load of 2.16 kg in accordance with JIS K 7210, A method.

As means for setting the melt flow rate within the above-described range, control can be performed by the ethylene content molar ratio and the weight average molecular weight (Mw) of the ethylene-propylene copolymer panicles.

The weight average molecular weight of the ethylene-propylene copolymer particles is preferably within a range of 300000 to 400000, more preferably within a range of 300000 to 350000.

The weight average molecular weight is calculated from a polystyrene (PS)-equivalent molecular weight distribution by gel permeation chromatograph analysis (GPC).

The conditions for the analysis method are as follows.
    Apparatus: PL-GP S220 manufactured by Agilent Technologies
    Column: Agilent PLgel Olexis×2+Guard
    Dissolving liquid: o-dichlorobenzene
    Temperature: 145° C.
    Concentration: 0.1 wt/vol %
    Flow rate: 1.0 mL/min
    Pretreatment: hot filtration (filter with a pore size of 0.5 μm)
    Solubility: complete dissolution
    Detector: differential diffractometer (RI)

<Melting Point>

In the powder stacking molding method, it is essential that the melting point of the resin powder for three-dimensional molding according to the present invention be within a range of 100 to 160° C. and satisfy the relationship of expression (1):

$$\text{(melting point temperature} - \text{recrystallization temperature)} \geq 10° C. \quad \text{expression (1):}$$

The melting point is more preferably within a range of 120 to 150° C. In addition, it is more preferable that the melting point satisfy (melting point temperature−recrystallization temperature)≥15° C.

(Measurement Method)

The melting point and the recrystallization temperature are measured as follows.

In accordance with the measurement method in ISO 3146 (Method for Measuring Plastic Transition Temperature, JIS K7121), an endothermic peak was measured with the temperature elevated at 10° C./min to a temperature higher by 30° C. than the melting point using a differential scanning calorimeter (DSC 7000X manufactured by Hitachi High-Tech Corporation). The melting point is an endothermic peak temperature. Thereafter, the temperature was lowered at 10° C./min to −30° C. or lower, and a recrystallization peak was measured. The recrystallization temperature is an exothermic peak temperature.

<Number Average Particle Size>

In the resin powder for three-dimensional molding according to the present invention, the number of particles having an average particle size 0.15 times the number average particle size (Mn) of the ethylene-propylene copolymer particles is preferably equal to or more than the number of the particles having the number average particle size (Mn). M1/M2 is preferably 0.5 or less, where M1 is the number of particles having the number average particle size (Mn) and M2 is the number of the particles having an average particle size 0.15 times the number average particle size (Mn).

The number of particles having an average particle size 0.41 times the number average particle size (Mn) of the ethylene-propylene copolymer particles is preferably equal to or more than the number of the particles having the number average particle size (Mn). M1/M3 is preferably 0.5 or less, where M3 is the number of particles having an average particle size 0.41 times the number average particle size (Mn).

Accordingly, the particles having an average particle size 0.5 or 0.41 times the number average particle size (Mn) are disposed between the particles having the number average particle size (Mu), crystals can be more finely divided, and it is possible to enhance stiffness while maintaining strength.

(Measurement Method)

The number average particle size (Mn) of the copolymer particles is measured by a dry (air) method using a particle size distribution measuring apparatus (Microtrac MT 3300EXII manufactured by MicrotracBEL Corp.), where a particle refractive index for each powder is used and a solvent is not used. The particle refractive index is set to 1.5.

[Production of Resin Powder for Three-Dimensional Molding]

The resin powder for three-dimensional molding according to the present invention can be produced by synthesizing the ethylene-propylene copolymer particles, and then subjecting the ethylene-propylene copolymer particles to grinding treatment by a grinding method such as a mechanical grinding method or a wet grinding method, or treatment for sphering particles.

[Synthesis of Ethylene-Propylene Copolymer]

The ethylene-propylene copolymer which is contained in the resin powder for three-dimensional molding according to the present invention can be synthesized by, for example, polymerizing propylene and copolymerizing propylene and ethylene using an olefin polymerizing catalyst containing a solid-state titanium catalyst component (I) and an organometallic compound catalyst component (II) described below.

Hereinafter, the catalyst components (I) and (II) and the polymerization method will be described.

(Sold-State Titanium Catalyst Component (I))

Preferably, the solid-state titanium catalyst component (I) contains titanium, magnesium, halogen, and an electron donor if necessary. As the solid-state titanium catalyst component (I), a known solid-state titanium component can be used without limitation.

An example of a method for producing the solid-state titanium catalyst component (I) is shown below.

Preferably, a magnesium compound and a titanium compound are used for preparation of the solid-state titanium catalyst component (I) according to the present invention.

Specific examples of the magnesium compound include known magnesium compounds such as magnesium halides such as magnesium chloride and magnesium bromide; alkoxymagnesium halides such as methoxymagnesium chloride, ethowmagnesium chloride and phenoxymagnesium chloride; alkowinagnesiums such as ethoxymagnesium, isopropoxymagnesium, butoxymagnesium and 2-ethylhexoxymagnesium; aryloxymagnesiums such as phenoxymagnesium: and carboxylic acid salts of magnesium such as magnesium stearate.

These magnesium compounds may be used alone, or used in combination of two or more thereof. These magnesium compounds may be complex compounds with other metals, double compounds or mixtures with other metal compounds.

Of these, magnesium compounds containing a halogen are preferable, and magnesium halides, particularly magnesium chloride, are preferably used. In addition, alkoxymagnesiums such as ethoxymagnesium are preferably used. The magnesium compound nay be one derived from another substance, for example one obtained by bringing an organomagnesium compound into contact with a titanium halide, a silicon halide, an alcohol halide or the like, such as a Grignard reagent.

Examples of the titanium compound include tetravalent titanium compounds of the following formula.

$$Ti(OR)_gX_{4-g}$$

wherein R represents a hydrocarbon group; X represents a halogen atom; and g is 0 or more and 4 or less.

More specific examples thereof include titanium tetrahalides such as $TiCl_4$ and $TiBr_4$; alkoxytitanium trihalaides such as $Ti(OCH_3)Cl_3$, $Ti(OC_2H_5)Cl_3$, $Ti(O\text{-n-}C_4H_9)Cl_3$, $Ti(OC_2H_5)Br_3$ and $Ti(O\text{-iso}C_4H_9)Br_3$; alkoxytitanium dihalides such as $Ti(OCH_3)_2Cl_2$ and $Ti(OC_2H_5)_2Cl_2$; alkoxytitanium nonohalides such as $Ti(OCH_3)_3Cl$, $Ti(O\text{-n-}C_4H_9)_3Cl$ and $Ti(OC_2H_5)_3Br$; and tetraalkoxytitaniums such as $Ti(OCH_3)_4$, $Ti(OC_2H_5)_4$, $Ti(OC_4H_9)_4$ and $Ti(O\text{-2-ethylhexyl})_4$.

Of these, titanium tetrahalides are preferable, and titanium tetrachloride is particularly preferable. These titanium compounds may be used alone, or used in combination of two or more thereof.

Examples of the magnesium compounds and titanium compounds include compounds described in detail in JP 57-63310A and JP 5-170843A.

Preferred specific examples of preparation of the solid-state titanium catalyst component (I) for use in the present invention include methods (P-1) to (P-4) described below:

(P-1): a method in which a solid-state adduct composed of a magnesium compound and an electron donor component (a) such as an alcohol, an electron donor component (b) described later and a liquid-state titanium compound are brought into contact with one another in a suspended state in the presence of an inert hydrocarbon solvent;

(P-2): a method in which a solid-state adduct composed of a magnesium compound and an electron donor component (a), an electron donor component (b) and a liquid-state titanium compound are brought into contact with one another in a plurality of batches;

(P-3): a method in which a solid-state adduct composed of a magnesium compound and an electron donor component (a), an electron donor component (b) and a liquid-state titanium compound are brought into contact with one another in a suspended state in the presence of an inert hydrocarbon solvent and in a plurality of batches; and (P-4): a method in which a liquid-state magnesium compound composed of a magnesium compound and an electron donor component (a), a liquid-state titanium compound and an electron donor component (b) are brought into contact with one another.

The reaction temperature is preferably −30 to 150° C., more preferably −25 to 130° C. still more preferably −25 to 120° C.

Production of the solid-state titanium catalyst component can also be performed in the presence of a known medium if necessary. Examples of the medium include aromatic hydrocarbons such as toluene, known aliphatic hydrocarbons such as heptane, octane, decane and cyclohexane and alicyclic hydrocarbon compounds which are slightly polar. Of these, preferred examples include aliphatic hydrocarbons.

The electron donor component (a) used for formation of the solid-state adduct and the liquid-state magnesium compound is preferably a known compound capable of solubilizing the magnesium compound in the temperature range from room temperature to about 300° C. such as alcohol, aldehyde, amine, carboxylic acid or a mixture thereof. Examples of these compounds include compounds described in detail in JP 57-63310A and JP 5-170843A.

More specific examples of the alcohol capable of solubilizing the magnesium compound include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol; alicyclic alcohols such as cyclohexanol and methylcyclohexanol, aromatic alcohols such as benzyl alcohol and methylbenzyl alcohol; and aliphatic alcohols having an alkoxy group, such as n-butyl cellosolve.

Examples of the carboxylic acid include organic carboxylic acids having 7 or more carbon atoms, such as caprylic acid and 2-ethylhexanoic acid. Examples of the aldehyde include aldehydes having 7 or more carbon atoms, such as capric aldehyde and 2-ethylhexyl aldehyde.

Examples of the amine include amines having 6 or more carbon atoms, such as heptylamine, octylamine, nonylamine, laurylamine and 2-ethylhexylamine.

The electron donor component (a) is preferably any of the above-described alcohols, particularly preferably ethanol, propanol, butanol, isobutanol, hexanol, 2-ethylhexanol and decanol.

The composition ratio of magnesium in the obtained solid-state adduct or the liquid-state magnesium compound to the electron donor component (a) varies depending on the type of compound used, and therefore cannot be definitely specified, and the amount of the electron donor component (a) is in the range of preferably 2 mol or more, more preferably 2.3 mol or more, still more preferably 2.7 mol or more and 5 mol or less, based on 1 mol of magnesium in the magnesium compound.

Particularly preferred examples of the electron donor used if necessary in the solid-state titanium catalyst component (I) for use in the present invention include aromatic carboxylic acid esters and/or compounds having two or more ether bonds with a plurality of carbon atoms therebetween (hereinafter, also referred to as "electron donor component (b)").

As the electron donor component (b), known aromatic carboxylic acid esters and polyether compounds which have been preferably used for olefin polymerizing catalysts heretofore, and for example, compounds described in JP 5-170843A, JP 2001-354714A and the like can be used without limitation.

Specific examples of the aromatic carboxylic acid ester include aromatic carboxylic acid monoesters such as benzoic acid esters and toluic acid esters, and aromatic polyvalent carboxylic acid esters such as phthalic acid esters. Of these, aromatic polyvalent carboxylic acid esters are preferable, and phthalic acid esters are more preferable. The phthalic acid ester is preferably a phthalic acid alkyl ester such as ethyl phthalate, n-butyl phthalate, isobutyl phthalate, hexyl phthalate or heptyl phthalate, particularly preferably diisobutyl phthalate.

More specific examples of the polyether compound include compounds having a structure of the following formula (1).

[Formula 1]

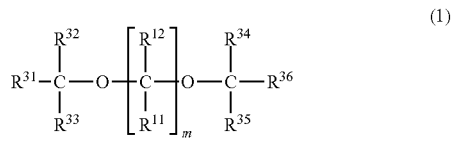

In the above formula (1), m is an integer of 1 or more and 10 or less, more preferably an integer of 3 or more and 10 or less, and $R^{11}$ to $R^{36}$ are each independently a hydrogen atom, or a substituent having at least one element selected from carbon, hydrogen, oxygen, fluorine, chlorine, bromine, iodine, nitrogen, sulfur, phosphorus and silicon.

When m is 2 or more, a plurality of $R^{11}$s and $R^{12}$s may be the same or different. Amy of $R^{11}$ to $R^{36}$, preferably $R^{11}$ and $R^{12}$ may be linked together to form a ring other than a benzene ring.

Specific examples of some of such compounds include monosubstituted alkoxypropanes such as 2-isopropyl-1,3-dimethoxypropane, 2-s-butyl-1,3-dimethoxypropane and 2-cumyl-1,3-dimethoxypropane; disubstituted dialkoxypropanes such as 2-isopropyl-2-isobutyl-1,3-dimethoxypropane, 2,2-dicyclohexyl-1,3-dimethoxypropane, 2-methyl-2-isopropyl-1,3-methoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-methoxypropane, 2-isopropyl-2-isopentyl-1,3-dimethoxypropane and 2-cyclohexyl-2-cyclohexylmethyl-1,3-dimethoxypropane, dialkoxyalkanes such as 2,3-dicyclohexyl-4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane and 2,4-diisoamyl-1,5-dimethoxypentane; and trialkoxyalkanes such as 2-methyl-2-methoxymethyl-1,3-dimethoxypropane, 2-cyclohexyl-2-ethoxyethyl-1,3-diethoxypropane and 2-cyclohexyl-2-methoxy methyl-1,3-dimethoxypropane.

Of these, 1,3-diethers are preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl) 1,3-dimethoxypropane are particularly preferable.

These compounds may be used alone, or used in combination of two or more thereof.

In the solid-state titanium catalyst component (I) for use in the present invention, the ratio of halogen to titanium (atom ratio) (i.e. the number of moles of halogen atoms/the number of moles of titanium atoms) is 2 to 100, preferably 4 to 90, and for the electron donor component (a) and the electron donor component (b), the ratio of the electron donor component (a) to titanium atoms (molar ratio) is 0 to 100, preferably 0 to 10, and the ratio of the electron donor component (b) to titanium atoms (molar ratio) is 0 to 100, preferably 0 to 10.

The ratio of magnesium to titanium (atom ratio) (i.e. the number of moles of magnesium atoms/the number of moles of titanium atoms) is 2 to 100, preferably 4 to 50.

As more specific conditions for preparation of the solid-state titanium catalyst component (I), conditions described in, for example, EP 585869A1 (European Patent Application Publication No. 0585869) and JP 5-170843A can be preferably used except that the electron donor component (b) is used.

The organometallic compound catalyst component (II) containing a metal element selected from Group 1, Group 2 and Group 13 of the periodic table will now be described.

(Organometallic Compound Catalyst Component (II))

As the organometallic compound catalyst component (II), compounds containing a metal of Group 13, such as organoaluminum compounds, complex alkylated products of a metal of Group 1 and aluminum, and organometallic compounds of a metal of Group 2 can be used. Of these, organoaluminum compounds are preferable.

Specifically, preferred examples of the organometallic compound catalyst component (II) include organometallic compound catalyst components disclosed in known documents such as EP 585869A1.

In addition to the electron donor component (a) and the electron donor component (b), a known electron donor component (c) may be used in combination as long as the purpose of the present invention is not impaired.

Such an electron donor component (c) is preferably an organosilicon compound. Examples of the organosilicon compound include compounds of the following formula:

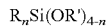

$R_nSi(OR')_{4-n}$ wherein R and R' each represent a hydrocarbon group, and n is an integer of more than 0 and less than 4.

As the organosilicon compound of the above formula, specifically, diisopropyldimethoxysilane, t-butylmethyldimethoxysilane, t-butylmethyldiethoxysilane, t-armylmetlhyldiethoxysilane, dicyclohexyldimethoxysilane, cyclohexylmethyldimethoxysilane, cyclohexylnethyldiethoxysilane, vinyltrimethoxysilane, vinyltriethoxysilane, t-butyltriethoxysilane, phenyltriethoxysilane, cyclohexyltrimethoxysilare, cyclopentyltrimethoxysilane, 2-metlylcyclopentyltrimethoxysilane, cyclopentyltriethoxysilare, dicyclopentyldimethoxysilane, dicyclopentyldiethoxysilane, tricyclopentylhnethoxysilane, dicyclopentylmethylmethoxysilane, dicyclopentylethylmethoxysilane, cyclopentyldutnethylethoxysilane and the like are used.

Of these, vinyltriethoxysilane, diphenyldimethoxysilane, dicyclohexyldimethoxysilane, cyclohexyhnethyldimethoxysilar and dicyclopentyldimethoxysilane are preferably used.

In addition, silane compounds of the following formula which are disclosed in WO 2004/016662 are preferred examples of the organosilicon compounds.

$Si(OR^a)_3(NR^bR^c)$

In the formula, $R^a$ is a hydrocarbon group having 1 to 6 carbon atoms, examples of $R^a$ include unsaturated or saturated aliphatic hydrocarbon groups having 1 to 6 carbon atoms, and hydrocarbon groups having 2 to 6 carbon atoms are particularly preferable. Specific examples thereof include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group and a cyclohexyl group, and of these, an ethyl group is particularly preferable.

$R^b$ is a hydrocarbon group having 1 to 12 carbon atoms, or hydrogen, and examples of $R^b$ include unsaturated or saturated aliphatic hydrocarbon groups having 1 to 12 carbon atoms, and hydrogen. Specific examples thereof include a hydrogen atom, a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group and an octyl group, and of these, an ethyl group is particularly preferable.

$R^c$ is a hydrocarbon group having 1 to 12 carbon atoms, and examples of $R^c$ include unsaturated or saturated aliphatic hydrocarbon groups having 1 to 12 carbon atoms, and hydrogen. Specific examples thereof include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group and an octyl group, and of these, an ethyl group is particularly preferable.

Specific examples of the compound of the above formula include dimethylaminotriethoxysilane, diethylaminotriethoxysilane, diethylaminotrimethoxysilane, diethylaminotriethoxysilane, diethylaminotri(n-propoxyxilane), di(n-propylaminotriethoxysilate), methyl n-propylaminotriethoxysilane, t-butylaminotriethoxysilane, ethyl n-propylaminotriethoxysilane, ethyl iso-propylaminotriethoxysilane and nethylethylannotriethoxysilane.

Other examples of the organosilicon compound include compounds of the following formula:

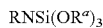

$RNSi(OR^a)_3$ wherein RN represents a cyclic amino group. Examples of the cyclic amino group include a perihydroquinolino group, a perhydroisoquinolino group, a 1,2,3,4-tetrahydroquinolino group, a 1,2,3,4-tetrahydroisoquinolino group and an octamethyleneimino group.

Specific examples of the compound of the above formula include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane and octamethyleneiminotrietoxysilane.

These organosilicon compounds can be used in combination of two or more thereof.

The ethylene-propylene copolymer can be synthesized by, for example, a method in which propylene is polymerized in the presence of the above-described olefin polymerizing catalyst, propylene and ethylene are then copolymerized, or propylene is polymerized in the presence of a prepolymerization catalyst obtained by performing prepolymerization, and propylene and ethylene are then copolymerized.

The prepolymerization is performed by prepolymerizing the olefin at normally 0.1 to 1000 g, preferably 0.3 to 500 g, particularly preferably 1 to 200 g per g of the olefin polymerizing catalyst.

In the prepolymerization, it is possible to use a catalyst with a concentration higher than the concentration of the catalyst in the system in the primary polymerization.

The concentration of the solid-state titanium catalyst component (I) in the prepolymerization is in the range of normally about 0.001 to 200 mmol, preferably about 0.01 to 50 mmol, particularly preferably 0.1 to 20 mmol in terms of titanium atoms per little of the liquid medium.

The amount of the organometallic compound catalyst component (II) in the prepolymerization may be an amount allowing the polymer to be generated at normally 0.1 to 1000 g, preferably 0.3 to 500 g per g of the solid-state titanium catalyst component (I), and is normally about 0.1 to 300 mol, preferably about 0.5 to 100 mol, particularly preferably 1 to 50 mol per mol of titanium atoms in the solid-state titanium catalyst component (I).

In the prepolymerization, the electron donor component and the like can also be used if necessary, and here these components are used at normally 0.1 to 50 mol, preferably 0.5 to 30 mol, still more preferably to 10 mol per mol of titanium atoms in the solid-state titanium catalyst component (I).

The prepolymerization can be performed under mild conditions by adding the olefin and the catalyst component to an inert hydrocarbon medium.

Here, specific examples of the inert hydrocarbon medium used include aliphatic hydrocarbons such as propane, butane, pentane, hexane, heptane, octane, decane, dodecane and kerosene: alicyclic hydrocarbons such as cyclopentane, methylcyclopentane, cyclohexane, cycloheptane, methylcycloheptane and cyclooctane; aromatic hydrocarbons such as benzene, toluene and xylene; halogenated hydrocarbons such as ethylene chloride and chlorobenzene; and mixtures thereof.

Of these inert hydrocarbon media, aliphatic hydrocarbons are particularly preferably used. Thus, when an inert hydrocarbon medium is used, it is preferable to perform prepolymerization in a batch mode.

On the other hand, it is also possible to perform prepolymerization with the olefin itself as a solvent or perform prepolymerization substantially without a solvent. In this case, it is preferable to perform prepolymerization continuously.

The olefin used in the prepolymerization may be the same as or different from the olefin used in primary polymerization described later, and is preferably propylene.

The temperature during the prepolymerization is in the range of normally −20 to +100° C., preferably −20 to +80° C. more preferably 0 to +40° C.

Primary polymerization will now be described which is performed after passing through prepolymerization or performed without passing through prepolymerization.

The primary polymerization is divided into a step of producing a propylene polymer component and a step of producing an ethylene-propylene copolymer rubber component.

The prepolymerization and the primary polymerization can be performed by any of a liquid-phase polymerization method such as bulk polymerization, solution polymerization or suspension polymerization and gas-phase polymerization. For the step of producing a propylene polymer component, a liquid-phase polymerization method such as bulk polymerization or suspension polymerization or a gas-phase polymerization method is preferable. For the step of producing a propylene-ethylene copolymer rubber component, a liquid-phase polymerization method such as bulk polymerization or suspension polymerization or a gas-phase polymerization method is preferable, and a gas-phase polymerization method is more preferable.

When the primary polymerization takes a reaction form of slurry polymerization, an inert hydrocarbon which is used during the prepolymerization can be used or an olefin which is liquid at a reaction temperature and pressure can be used as a reaction solvent.

In the primary polymerization, the solid-state titanium catalyst component (I) is used at normally about 0.001 to 0.5 mmol, preferably about 0.005 to 0.1 mmol in terms of titanium atoms per little of polymerization volume. The organometallic compound catalyst component (II) is used at normally about 1 to 2000 mol, preferably about 5 to 500 mol based on 1 mol of titanium atoms in the prepolymerization catalyst component in the polymerization system. When the electron donor component is used, it is used at 0.001 to 50 mol, preferably 0.01 to 30 mol, particularly preferably 0.05 to 20 mol based on 1 mol of the organometallic compound catalyst component (II).

When the primary polymerization is performed in the presence of hydrogen, the molecular weight of the resulting polymer can be adjusted (reduced), so that a polymer having a high melt flow rate can be obtained. The amount of hydrogen necessary for adjusting the molecular weight varies depending on the type of production process used, the polymerization temperature and the pressure, and therefore may be appropriately adjusted.

In the step of producing a propylene polymer component, MFR can be adjusted by adjusting the polymerization temperature and the amount of hydrogen. In addition, in the step of producing an ethylene-propylene copolymer rubber component, the limiting viscosity can be adjusted by adjusting the polymerization temperature, the pressure and the amount of hydrogen.

In the primary polymerization, the polymerization temperature of the olefin is normally about 0 to 200° C., preferably about 30 to 100° C. more preferably 50 to 90° C. The pressure (gauge pressure) is set to normally ordinary pressure to 100 kgf/cm$^2$ (9.8 MPa), preferably about 2 to 50 kgf/cm$^2$ (0.20 to 4.9 MPa).

In the method for producing an ethylene-propylene copolymer, polymerization can be performed by any of a batch method, a semicontinuous method and a continuous method. As a shape of a reactor, any of a tube type and a tank type can be used. Further, the polymerization can be performed in two stages with different reaction conditions. Hem, a tube type and a tank type can be combined.

The ethylene content molar ratio ("ethylene/(ethylene+ propylene)") in the gas composition is controlled for obtaining an ethylene-propylene copolymer according to the present invention.

Preferably, the ethylene content molar ratio (ethylene/ (ethylene+propylene)) is controlled to fall within a range of 0.001 to 0.04, preferably 0.005 to 0.035, more preferably 0.07 to 0.03.

The ethylene-propylene copolymer particles obtained as described above are subjected to grinding treatment by a grinding method such as a mechanical grinding method or a wet grinding method, or treatment for sphering particles to produce a resin powder for three-dimensional molding. Such treatment enables production of a resin powder for three-dimensional molding in which the volume average particle size of ethylene-propylene copolymer particles is within a range of 5 to 200 μm.

<Mechanical Grinding Method>

In the mechanical grinding method, the produced ethylene-propylene copolymer particles are mechanically ground to produce particles having a desired average particle size. In the mechanical grinding method, the particles can be produced by the following method.

The ethylene-propylene copolymer particles may be frozen and then ground, or may be ground at ordinary temperature. The mechanical grinding method can be carried out by a known apparatus for grinding a thermoplastic resin. Examples of the apparatus include hammer mills, jet mills, ball mills, impeller mills, cutter mills and two-shaft crushers.

In the mechanical grinding method, it may be impossible to obtain particles having a desired particle size because ethylene-propylene copolymer particles are melted and bonded by frictional heat generated from the ethylene-propylene copolymer particles during grinding. Thus, it is preferable that ethylene-propylene copolymer particles be cooled with liquid nitrogen etc., embrittled, and then ground.

In the mechanical grinding method, the average particle size of particles produced can be adjusted within a desired range (volume average particle size: 5 to 200 μm) by appropriately adjusting the amount of a solvent with respect to ethylene-propylene copolymer particles, or the grinding method or speed.

A desired particle size by grinding is determined by the operation time of the apparatus, which is preferably within a range of 5 to 45 hours.

Specifically, it is preferable that ethylene-propylene copolymer particles be cooled to about −150° C. with liquid nitrogen, and ground by the grinding apparatus so that the volume average particle size is within a range of 5 to 200 μm.

<Wet Grinding Method>

In the wet grinding method, ethylene-propylene copolymer particles are dissolved in a solvent by heating and stirring, the resin solution obtained by the dissolution is cooled with stirring, and the resin slurry obtained by the cooling is ground by vacuum drying with stirring to produce particles having a desired average particle size. Specific examples of the wet grinding method include a method disclosed in JP 3-12428A.

<Treatment for Sphering Particles>

As treatment for sphering particles, mention is made of means for applying an mechanical impact force, and examples thereof include methods using a mechanical impact type grinding machine, such as Kryptron System (manufactured by Kawasaki Heavy Industries, Ltd.) and Turbo Mill (manufactured by Turbo Industry Co., Ltd.).

Examples thereof also include a method in which as in Mechanofusion System (manufactured by Hosokawa Micron Corporation), Hybridization System (manufactured by Nara Machinery Co., Ltd.) or the like, ethylene-propylene copolymer particles am pressed against the inside of a casing by a centrifugal force using a vane rotating at a high speed, and a mechanical impact force is applied to the ethylene-propylene copolymer particles by a force such as a compressive force or a frictional force.

<Other Materials>

The resin powder for three-dimensional molding according to the present invention may further contain other materials such as a laser absorbing material and a flow agent as long as fusion by laser irradiation as described later and close packing of the ethylene-propylene copolymer particles during formation of a thin layer are not markedly hindered, and the accuracy of the three-dimensional molded article is not markedly decreased.

(Laser Absorber)

The resin powder for three-dimensional molding may further contain a laser absorber from the viewpoint of more efficiently converting of light energy of laser into heat energy. The laser absorber may be a material which generates heat by absorbing laser having a wavelength used. Examples of the laser absorber include carbon powder, nylon resin powder, pigments and dyes. Only one of these laser absorbers may be used, or two of these laser absorbers may be used in combination.

The amount of the laser absorber can be appropriately set within the bounds of easily melting and bonding the copolymer particles, and can be, for example, more than 0 mass % and less than 3 mass % based on the total mass of the resin powder for three-dimensional molding.

(Flow Agent)

The resin powder for three-dimensional molding may further contain a flow agent from the viewpoint of further improving the flowability of the resin powder for three-dimensional molding to facilitate handling of the powder for three-dimensional molding during production of a three-dimensional molded article.

The flow agent may be a material having a small friction coefficient and self-lubricating properties. Examples of the flow agent include silicon dioxide and boron nitride. Only one of these flow agents may be used, or two of these flow agents may be used in combination. In the resin powder for three-dimensional molding, the copolymer particles are hardly charged even when flowability is enhanced by the flow agent, so that the copolymer particles can be further closely packed during formation of a thin film.

The amount of the flow agent can be appropriately set within the bounds of further improving the flowability of the resin powder for three-dimensional molding, and can be, for example, more than 0 mass % and less than 2 mass % based on the total mass of the resin powder for three-dimensional molding.

The resin powder for three-dimensional molding according to the present invention can be produced by synthesizing the ethylene-propylene copolymer particles, and stirring and mixing the copolymer particles with a material other than the copolymer particles if necessary.

[Three-Dimensional Molded Article]

The three-dimensional molded article of the present invention is a three-dimensional molded article formed using a resin powder for three-dimensional molding, the three-dimensional molded article being a sintered product or a molten product of the resin powder for three dimensional molding.

The three-dimensional molded article of the present invention can be produced by a powder bed fusion method (PBF method) described later using the resin powder for three-dimensional molding.

[Method for Producing Three-Dimensional Molded Article]

A method for producing a three-dimensional molded article according to the present invention can be the same as a normal powder bed fusion method except that the resin powder for three-dimensional molding is used.

Specifically, the method for producing a three-dimensional molded article according to the present invention comprises the steps of: (1) forming a thin layer of the resin powder for three-dimensional molding; (2) selectively irradiating the preheated thin layer with laser light to form a molded article layer in which ethylene-propylene copolymer particles contained in the resin powder for three-dimensional molding are fused; and (3) carrying out step (1) and step (2) in this order multiple times to stack the molded article layers.

One of the molded article layers forming the three-dimensional molded article is formed in step (2), and step (1) and step (2) are repeatedly carried out in step (3), so that subsequent layers of the three-dimensional molded article are stacked to produce a final three-dimensional molded article. The method for producing a three-dimensional molded article according to the present invention may comprise (4) a step of preheating the formed thin layer of the resin powder for three-dimensional molding at least before step (2).

<Step of Forming Thin Layer Composed of Resin Powder for Three-Dimensional Molding (Step (1))>

In this step, a thin layer of the resin powder for three-dimensional molding is formed. For example, the resin powder for three-dimensional molding which is supplied from a powder supplier is flatly laid on a molding stage by a recoater. The thin layer may be formed directly on the molding stage, or may be formed in contact with the resin powder for three-dimensional molding which has been already laid or the molded article layer which has been already formed.

The thickness of the thin layer can be set in line with the thickness of the molded article layer. The thickness of the thin layer can be arbitrarily set according to the accuracy of the three-dimensional molded article to be produced, and is normally within a range of 0.01 to 0.30 mm. By setting the thickness of the thin layer to 0.01 mm or more, fusion of the copolymer particles in the underlying layer or remelting of the molded layer as the underlying layer by laser irradiation for forming the subsequent layer can be prevented. By setting the thickness of the thin layer to 0.30 mm or less, laser energy can be conducted to the lower part of the thin layer and the copolymer particles contained in the resin powder for three-dimensional molding which forms the thin layer can be sufficiently fused entirely in the thickness direction.

From the above-described viewpoint, the thickness of the thin layer is more preferably within a range of 0.01 to 0.10 mm. From the viewpoint of more sufficiently fusing the copolymer particles entirely in the thickness direction of the thin layer, so that cracking between stacked layers is less likely to occur, it is preferable to set the thickness of the thin layer so that a difference between the thickness of the thin layer and the beam spot diameter of laser described later is 0.10 mm or less.

<Step of Forming Molded Article Layer in which Ethylene-Propylene Copolymer Particles are Fused (Step (2))>

In this step, a location on the formed thin layer at winch the molded article layer is to be formed is selectively irradiated with laser to fuse the copolymer particles at the irradiated location. Accordingly, adjacent copolymer particles are fused together to form a fused combination, thereby obtaining a molded article layer. Here, the copolymer particles receiving energy of laser are also fused with an already formed layer, and therefore adhesion between adjacent layers also occurs.

The wavelength of laser may be set within the bounds of being absorbed at a wavelength corresponding to energy required for vibration, rotation and the like of constituent molecules of the copolymer particles. Here, it is preferable that the difference between the wavelength of laser and the wavelength at which the absorption ratio is the highest be small, and since resin can absorb light in various wavelength ranges, it is preferable to use laser with a wide wavelength band such as $CO_2$ laser. For example, the wavelength of laser is preferably within a range of 0.8 to 12 μm.

For example, the power of laser at the output time may be set within the bounds of sufficiently fusing the copolymer particles at a laser scanning rate described later, and can be specifically within a range of 10 to 100 W.

From the viewpoint of decreasing energy of laser to reduce the production cost and simplifying the configuration of a production apparatus, the power of laser at the output time is preferably 60 W or less, more preferably 40 W or less.

The laser scanning rate may be set within the bounds of not increasing the production cost and not excessively complicating the apparatus configuration. Specifically, the laser scanning rate is preferably within a range of 20000 mm/sec, more preferably within a range of 1000 to 18000 mm/sec, still more preferably within a range of 2000 to 15000 mm/sec. still more preferably within a range of 3 to 80 mm/sec, still more preferably within a range of 3 to 50 mm/sec.

The beam diameter of laser can be appropriately set according to the accuracy of the three-dimensional molded article to be produced.

<Step of Stacking Formed Thin Layers of Resin Powder for Three-Dimensional Molding (Step (3))>

In this step, step (1) and step (2) are repeated to stack the molded article layers formed in step (2). The molded article layers are stacked to produce a desired three-dimensional molded article.

<Step of Preheating Formed Thin Layers of Resin Powder for Three-Dimensional Molding (Step (4))>

In this step, the thin layer of the resin powder for three-dimensional molding is preheated before step (2). For example, by a heater or the like, the temperature of the surface of the thin layer (standby temperature) can be elevated to a temperature lower by 15° C., preferably 5° C., than the melting point of the copolymer particles.

<Others>

From the viewpoint of preventing a decrease in strength of the three-dimensional molded article due to oxidation of the copolymer particles during fusion, etc., it is preferable to carry out at least step (2) under reduced pressure or in an inert gas atmosphere. In the case of reduced pressure, the pressure is preferably $10^{-2}$ Pa or less, more preferably $10^{-3}$ Pa or less.

Examples of the inert gas which can be used in the present invention include nitrogen gas and rare gases. Of these inert gases, nitrogen ($N_2$) gas, helium (He) gas or argon (Ar) gas is preferable from the viewpoint of availability.

From the viewpoint of simplifying the production process, it is preferable to carry out all of steps (1) to (3) (all of steps (1) to (4) when step (4) is present) under reduced pressure or in an inert gas atmosphere.

<Three-Dimensional Molding Apparatus>

Except that the resin powder for three-dimensional molding is used, a three-dimensional molding apparatus according to the present invention can have the same configuration as that of a known apparatus for producing a three-dimensional molded article by a powder bed fusion method.

Specifically, as described in FIG. 1 which is a side view schematically showing the configuration of the three-dimensional molding apparatus 100, the three-dimensional molding apparatus 100 comprises: a molding stage 110 located in an opening; a thin film forming unit 120 for forming on the molding stage a thin film of a resin powder for three-dimensional molding which contains the ethylene-propylene copolymer particles; a laser irradiator 130 for irradiating the thin film with laser to form a molded article layer in which the copolymer particles are fused; a stage supporter 140 for supporting the molding stage 110 such that the molding stage 110 can change its location in a vertical direction: and a base 145 for supporting the above-described units.

Figure 2:
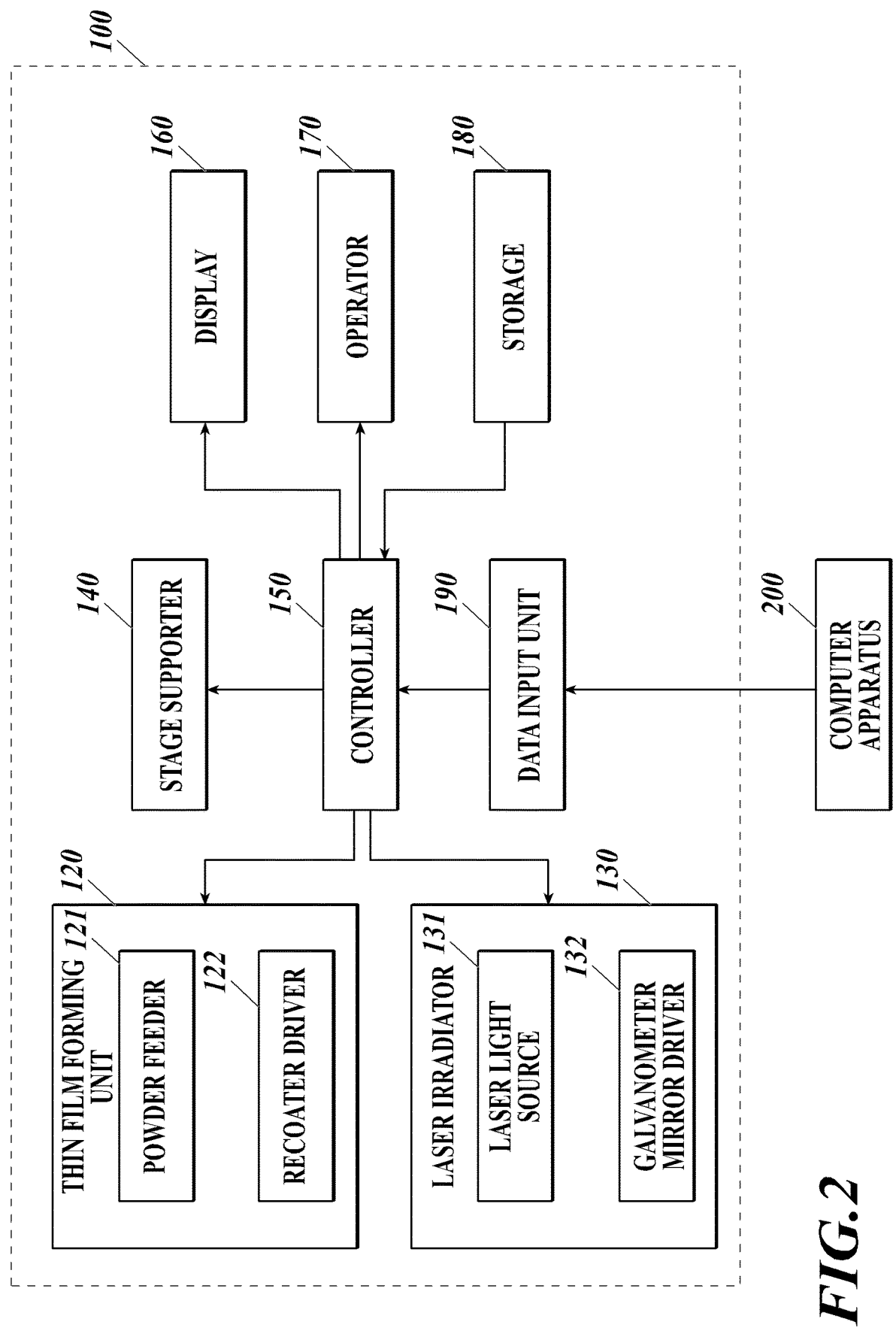
FIG. 2 shows a main part of a control system of a three-dimensional molding apparatus in an embodiment of the present invention.

As shown in FIG. 2 showing main parts of a control system of the three-dimensional molding apparatus 100, the three-dimensional molding apparatus 100 may comprise: a controller 150 for controlling the thin film forming unit 120, the laser irradiator 130 and the stage supporter 140 to repeatedly form and stack the molded article layer, a display 160 for displaying various kinds of information; an operator 170 including a pointing device etc. for receiving an instruction from a user, a storage 180 for storing various kinds of information including a control program executed by the controller 150; and a data input unit 190 including an interface etc. for performing transmission and reception of various kinds of information such as three-dimensional molded data with an external device. A computer apparatus 200 for generating data for three-dimensional molding may be connected to the three-dimensional molding apparatus 100.

On the molding stage 110, molded material layers are formed through formation of a thin film by the thin film forming unit 120 and irradiation with laser by the laser irradiator 130, and the molded material layers are stacked to form a three-dimensional molded article.

For example, the thin film forming unit 120 can be configured to comprise: an opening with its edge part lying on almost the same plane in a horizontal direction as that of the edge part of an opening through which the molding stage 110 rises and falls; a powder material housing extending downward from the opening in a vertical direction; a powder feeder 121 provided on the bottom part of the powder material housing and including a feeding piston which rises and falls through the opening; and a recoater 122a for flatly laying the fed powder material on the molding stage 110 to form a powder material thin layer.

The powder feeder 121 may be configured to comprise a powder housing provided in the upper part in the vertical direction with respect to the molding stage 110, and a nozzle, and discharge the resin powder for three-dimensional molding onto the same plane in the horizontal direction as that of the molding stage.

The laser irradiator 130 includes a laser light source 131 and a galvanometer mirror 132a. The laser irradiator 130 may comprise a lens for adapting the focal point distance of laser to the surface of the thin layer (not shown). The laser light source 131 may be a light source which emits laser having the above-described wavelength at the above-described output. Examples of the laser light source 131 include YAG laser light sources, fiber laser light sources and $CO_2$ laser light sources. The galvanometer mirror 132a may include an X mirror and a Y mirror which reflect laser emitted from the laser light source 131, where the X mirror scans the reflected laser in an X direction and the Y mirror scans the reflected laser in a Y direction.

The stage supporter 140 supports the molding stage 110 such that the molding stage 110 can change its location in the vertical direction. That is, the molding stage 110 is configured such that it can be accurately moved in the vertical direction by the stage supporter 140. The stage supporter 140 can take any of various configurations, and can include, for example, a holding member for holding the molding stage 110, a guide member for guiding the holding member in the vertical direction, and a ball screw engaged with a screw hole provided in the guide member.

The controller 150 controls operation of the entire three-dimensional molding apparatus 100 during operation of forming the three-dimensional molded article The controller 150 may be configured to include a hardware processor such as a central processing unit, so that for example, three-dimensional molding data acquired from the computer apparatus 200 by the data input unit 190 is converted into a plurality of slice data thinly sliced in a stacking direction of molded material layers. The slice data is molding data of the molded material layers for forming the three-dimensional molded article. The thickness of the slice data, i.e. the thickness of the molded article layer is equal to a distance (stacking pitch) corresponding to the thickness of one of the molded material layers.

The display 160 can be, for example, a liquid crystal display or a monitor.

The operator 170 can include, for example, pointing devices such as a keyboard and a mouse, and may comprise various operation keys such as a numeric key, an execution key and a start key.

The storage 180 can include, for example, various storage media such as ROM, RAM, a magnetic disc, HDD and SSD.

The three-dimensional molding apparatus 100 may comprise a decompressor (not shown) such as a decompression pump which is controlled by the controller 150 to decompress the inside of the apparatus, or an inert gas feeder (not shown) which is controlled by the controller 150 to feed an inert gas into the apparatus. The three-dimensional molding apparatus 100 may comprise a heater (not shown) which is controlled by the controller 150 to heat the inside of the apparatus, particularly the upper surface of the thin layer of the resin powder for three-dimensional molding.

<Example of Three-Dimensional Molding Using Three-Dimensional Molding Apparatus 100>

The controller 150 converts three-dimensional molding data acquired from the computer apparatus 200 by the data input unit 190 into a plurality of slice data thinly sliced in the stacking direction of molded material layers. Thereafter, the controller 150 controls the following operation of the three-dimensional molding apparatus 100.

In accordance with information on feeding which is output from the controller 150, the powder feeder 121 drives a motor and a drive mechanism (any of which is not shown), moves the feeding piston upward in the vertical direction (direction of arrow in the figure), and forces out the resin powder for three-dimensional molding onto the same plane in the horizontal direction as that of the molding stage.

Thereafter, in accordance with information on thin film formation which is output from the controller 150, a recoater driver 122 moves the recoater 122a in the horizontal direction (direction of arrow in the figure), conveys the resin powder for three-dimensional molding to the molding stage 110, and presses the powder material so that the thickness of the thin layer is equal to the thickness of one of the molded article layers.

Thereafter, in accordance with information on laser irradiation which is output from the controller 150, the laser irradiator 130 emits laser from the laser light source 131 to a region forming the three-dimensional molded article in each slice data, on the thin film, and drives the galvanometer mirror 132a with a galvanometer mirror driver 132 to scan laser. By irradiation with laser, the ethylene-propylene copolymer particles contained in the resin powder for three-dimensional molding are fused to form the molded article layer.

Thereafter, in accordance with information on position control which is output from the controller 150, the stage supporter 140 drives the motor and the drive mechanism (any of which is not shown), and moves the molding stage 110 downward in the vertical direction (direction of arrow in the figure) by a stacking pitch.

If necessary, the display 160 is controlled by the controller 150 to display various kinds of information and messages to be recognized by a user. The operator 170 receives various input operations by the user, and outputs operation signals corresponding to the input operations to the controller 150. For example, a virtual three-dimensional molded article formed is displayed on the display 160 to determine whether or not a desired shape is formed, and if a desired shape is not formed, the operator 170 may make an amendment.

If necessary, the controller 150 stores data in the storage 180 or draws data from the storage 180.

By repeating these operations, molded article layers are stacked to produce a three-dimensional molded article.

EXAMPLES

Hereinafter, the present invention will be described in detail by showing Examples, which should not be construed as limiting the present invention. In Examples below, operations were carried out at room temperature (25° C.) unless otherwise specified. Unless otherwise specified, "%" and "parts" mean "mass %" and "parts by mass", respectively.
[Production of Resin Powder 1 for Three-Dimensional Molding]
[Synthesis of Ethylene-Propylene Copolymer Particles 1]
(1) Preparation of Solid-State Titanium Catalyst Component 952 g of anhydrous magnesium chloride, 4420 mL of decane and 3906 g of 2-ethylhexyl alcohol were heated at 130° C. for 2 hours to obtain a homogeneous solution. To the solution was added 213 g of phthalic anhydride, and the mixture was stirred at 130° C. for 1 hour to dissolve the phthalic anhydride.

The homogeneous solution thus obtained was cooled to 23° C., and 750 mL of the homogeneous solution was then added dropwise for 1 hour to 2000 mL of titanium tetrachloride held at −20° C. After the dropwise addition, the temperature of the obtained mixed liquid was elevated to 110° C. for 4 hours, and when the temperature reached 110° C. 52.2 g of diisobutyl phthalate (DIBP) was added, followed by holding the mixture at the same temperature with stirring for 2 hours.

Subsequently, the solid part was taken by hot filtration, and resuspended in 2750 mL of titanium tetrachloride, and the mixture was heated again at 110° C. for 2 hours After completion of the heating, the solid part was taken again by hot filtration, and washed with decane and hexane at 110° C. until titanium compounds were no longer detected in the washing liquid.

The solid-state titanium catalyst component prepared as described above was stored as a hexane slurry, a part of the component was dried, and the catalyst composition was examined. The solid-state titanium catalyst component contained titanium at 2 mass %, chlorine at 57 mass %, magnesium at 21 mass % and DIBP at 20 mass %.
(2) Production of Prepolymerization Catalyst 87.5 g of the solid-state titanium catalyst component, 99.8 mL of triethylaluminum, 28.4 mL of diethylaminotriethoxysilane and 12.5 L of heptane were introduced into a stirrer-equipped autoclave having an internal volume of 20 L With the internal temperature at 15 to 20° C. 875 g of propylene was introduced, and the mixture was reacted with stirring for 100 minutes. After completion of the polymerization, solid components were allowed to precipitate, and removal of the supernatant liquid and washing with heptane were performed twice. The obtained prepolymerization catalyst was resuspended in purified heptane, and adjusted to a solid catalyst component concentration of 0.7 g/L with heptane.
(3) Primary Polymerization A jacket-equipped circulation-type tubular polymerization device having an internal volume of 58 L was continuously fed with propylene at 40 kg/hour, hydrogen at 123 NL/hour, the catalyst slurry produced in (2) as a solid catalyst component at 0.30 g/hour, triethylaluminum at 2.1 mL/hour and diethylaminotriethoxysilane at 0.88 mL/hour, and the mixture was subjected to polymerization in a state of a full liquid free of gas phase. The tubular polymerization device had a temperature of 70° C. and a pressure of 3.3 MPa/G.

The obtained slurry was sent to a stirrer-equipped vessel polymerization device having an internal volume of 100 L, and further subjected to polymerization. The polymerization device was fed with propylene at 15 kg/hour, and hydrogen at a hydrogen concentration of 3.3 mol % in the gas-phase part. The polymerization was performed at a polymerization temperature of 70° C. and a pressure of 3.1 MPa/G.

The obtained slum was transferred to a liquid transfer tube with an internal capacity of 2.4 L, and gasified, gas-solid separation was performed, polypropylene homopolymer powder was then sent to a gas-phase polymerization device with an internal capacity of 480 L to perform ethylene-propylene copolymerization.

Here, propylene, ethylene and hydrogen were continuously fed so as to set the composition of the gas in the gas-phase polymerization device to ethylene(ethylene+propylene)=0.01 (ethylene content molar ratio) and hydrogen/ethylene=0.10 (molar ratio). The polymerization was performed at a polymerization temperature of 70° C. and a pressure of 1.2 MPa/G, followed by performing vacuum drying at 80° C. to obtain ethylene-propylene copolymer particles 1.
<Mechanical Grinding Treatment>

The ethylene-propylene copolymer particles 1 obtained as described above were cooled to about −150° C. with liquid nitrogen, and ground to a volume average particle size of 80 μm by a grinding machine (LINREX MILL).
<Treatment for Sphering Particles>

After the grinding, treatment for sphering particles was performed. Specifically, by hybridization, a mechanical impact force was applied to the ethylene-propylene copolymer particles 1, so that the particles were sphered to obtain a resin powder 1 for three-dimensional molding which contains ethylene-propylene copolymer particles 1.

For the obtained resin powder 1 for three-dimensional molding, the volume average particle size, the ethylene content molar ratio, the melt flow rate and the weight average molecular weight (Mw) of the ethylene-propylene copolymer particles 1 were measured, and the result showed that the volume average particle size was 80 μm, the ethylene content molar ratio was 0.01, the melt flow rate was 30 g/10 min and the weight average molecular weight (Mw) was 28000.

The number average particle size (Mn) of the ethylene-propylene copolymer particles was measured, and the ratio of the number of particles having the number average particle size (Mn) (M1) to the number of particles having an average particle size 0.15 times the number average particle size (Mn) (M2) (M1/M2) was calculated. Further, the ratio of the number of particles having the number average particle size (Mn) (M1) to the number of particles having an average particle size 0.41 times the number average particle size (Mn) of the ethylene-propylene copolymer particles (M3) (M1/M3) was calculated. The table below shows the results.

The volume average particle size, the ethylene content molar ratio, the melt flow rate, the weight average molecular weight (Mw) and the number average particle size (Mn) were measured by the methods described above. Measurements were similarly made for resin powders 2 to 9 for three-dimensional molding which were produced as described below. For the number average particle size (Mn), the diffraction volume in the particle size distribution measuring apparatus (Microtrac MT 3300EXII manufactured by MicrotracBEL Corp.) was set to 0.8.

For the obtained resin powder 1 for three-dimensional molding, the melting point was measured by the method described above, and the value of (melting point temperature−recrystallization temperature) was calculated. The table below shows the results.

[Production of Resin Powders 2 to 9 for Three-Dimensional Molding]

Except that the volume average particle size in the mechanical grinding treatment was as shown in the table below and the ethylene content molar ratio in the gas-phase polymerization device was as shown in the table below, the same procedure as in the production of the resin powder 1 for three-dimensional molding was carried out to produce resin powders 2 to 9 for three-dimensional molding.

For the resin powder 2 for three-dimensional molding, the polymerization temperature was changed to 80° C. from 70° C. in the production of the resin powder 1 for three-dimensional molding.

For the resin powders 2 to 9 for three-dimensional molding, the volume average particle size, the ethylene content molar ratio, the melt flow rate, the weight average molecular weight (Mw), the melting point and the like were measured in the same manner as in the case of the resin powder 1 for three-dimensional molding. The table below shows the results.

[Production of Three-Dimensional Molded Articles 1 to 9]

By a three-dimensional molding apparatus ((RaFaEl 300) manufactured by ASPECT Inc.), each of the produced resin powders for three-dimensional molding was laid on the molding stage at a predetermined recoating rate (160 min/s) to forma 0.1 mm-thick thin film. This thin film was irradiated with laser light over an area of 300 mm (length)×300 un (width) from a $CO_2$ laser equipped with a galvanometer scanner for a $CO_2$ laser wavelength under the following conditions to produce a molded article layer. Thereafter, the resin powder for three-dimensional molding was further laid on the molded article layer, and irradiated with laser light to stack a molded article layer. These steps were repeated to produce each of three-dimensional molded articles (laminates of molded article products) 1 to 9.

Conditions for emission of laser light
Laser output: 30 W
Wavelength of laser light: 10.6 μm
Beam diameter: 300 μm on thin layer surface
Conditions for scanning of laser light
Scanning rate: 10000 mm/sec
Number of lines: 1

[Evaluation]

<Moldability>

Whether or not a three-dimensional molded article was obtained in the "production of three-dimensional molded article" was determined.

<Breaking Elongation>

The breaking elongation of the obtained three-dimensional molded article was measured using Tensilon Universal Testing Machine RTC-1250 (manufactured by A&D Company, Limited). The measurement conditions were set as follows, the breaking distance was taken as the breaking elongation, and evaluation was performed on the basis of whether a yield point was present or not. (It is determined there is no yield point if breakage occurs before the yield point)

Test piece for tension test shape conforming to JIS K7161
Tension rate: 50 mm/s
Chuck-to-chuck distance: 115 mm
Mark-to-mark distance: 100 mm <Tensile Elastic Modulus>

The tensile elastic modulus of the obtained three-dimensional molded article was measured using Tensilon Universal Testing Machine RTC-1250 (manufactured by A&D Company, Limited). The measurement conditions were set as follows. The tensile elastic modulus was determined from a linear regression between strains of 0.05% and 0.25%. It was determined that there was no problem in practical use when the value of the tensile elastic modulus was 80% or more of the tensile elastic modulus in Comparative Example 1 (1450 Mpa) (i.e. value of 1160 Mpa or more).

Test piece for tension test: shape conforming to JIS K7161
Tension rate: 1 mm/s
Cluck-to-chuck distance: 115 mm
Mark-to-mark distance: 100 mm

TABLE 1

| Three-dimensional molded article No. | Resin powder for three-dimensional molding No. | Volume average particle size [μm] | Ethylene content molar ratio | Melt flow rate [g/10 min] | Weight average molecular weight (Mw) | M1/M2 | M1/M3 |
|---|---|---|---|---|---|---|---|
| 5 | 5 | 80 | 0 | 30 | 300000 | 0.4 | 0.7 |
| 1 | 1 | 80 | 0.01 | 30 | 280000 | 0.4 | 0.7 |
| 2 | 2 | 80 | 0.01 | 7 | 340000 | 0.4 | 0.7 |
| 3 | 3 | 78 | 0.025 | 30 | 260000 | 0.3 | 0.7 |
| 4 | 4 | 82 | 0.025 | 7 | 330000 | 0.3 | 0.7 |
| 6 | 6 | 81 | 0.0005 | 20 | 310000 | 0.4 | 0.7 |
| 7 | 7 | 50 | 0.05 | 20 | 390000 | 0.4 | 0.7 |
| 8 | 8 | 90 | 0.01 | 45 | 220000 | 0.5 | 0.8 |
| 9 | 9 | 65 | 0.01 | 1 | 400000 | 0.2 | 0.4 |

| Melting point [° C.] | Melting point temperature − recrystallization temperature [° C.] | Moldability | Tensile elastic modulus [Mpa] | Breaking elongation | Remarks |
|---|---|---|---|---|---|
| 164 | 46 | BB | 1450 | No yield point | Comparative Example 1 |
| 142 | 32 | BB | 1400 | Yield point present | Example 1 |
| 146 | 34 | BB | 1420 | Yield point present | Example 2 |
| 132 | 28 | BB | 1200 | Yield point present | Example 3 |
| 134 | 30 | BB | 1250 | Yield point present | Example 4 |

TABLE 1-continued

| | | | | | |
|---|---|---|---|---|---|
| 158 | 42 | BB | 1400 | No Yield point | Comparative Example 2 |
| 123 | 31 | BB | 450 | Yield point present | Comparative Example 3 |
| 141 | 30 | DD | — | — | Comparative Example 4 |
| 145 | 35 | DD | — | — | Comparative Example 5 |

As is evident from the results described above, the resin powders for three-dimensional molding according to the present invention enable production of a three-dimensional molded article and have a good tensile elastic modulus and good breaking elongation in comparison with the resin powders for three-dimensional molding in Comparative Example.

INDUSTRIAL APPLICABILITY

The present invention can be used for a resin powder for three-dimensional molding which includes a polypropylene resin and has good tensile strength and excellent breaking elongation, a three-dimensional molded article, and a method for producing a three-dimensional molded article.

REFERENCE SIGNS LIST

100 Three-dimensional molding apparatus
110 Molding stage
120 Thin film forming unit
121 Powder feeder
122 Recoater driver
122a Recoater
130 Laser irradiator
131 Laser light source
132 Galvanometer mirror driver
132a Galvanometer mirror
140 Stage supporter
145 Base
150 Controller
160 Display
170 Operator
180 Storage
190 Data input unit
200 Computer apparatus

The invention claimed is:

1. A resin powder for three-dimensional molding, comprising ethylene-propylene copolymer particles, wherein
the volume average particle size of the ethylene-propylene copolymer particles is within a range of 5 to 200 µm,
the ethylene content molar ratio (ethylene/(ethylene+propylene)) in the ethylene-propylene copolymer particles is within a range of 0.001 to 0.04,
the melt flow rate (MFR) is within a range of 3 to 40 g/10 min at 230° C. and a load of 2.16 kg, and
the melting point is within a range of 100 to 160° C. and satisfies the relationship of expression (1):

(melting point temperature−recrystallization temperature)≥10° C.

2. A resin powder for three-dimensional molding, comprising ethylene-propylene copolymer particles, wherein
the volume average particle size of the ethylene-propylene copolymer particles is within a range of 5 to 200 µm,
the ethylene content molar ratio (ethylene/(ethylene+propylene)) in the ethylene-propylene copolymer particles is within a range of 0.001 to 0.04,
the melt flow rate (MFR) is within a range of 3 to 40 g/10 min at 230° C. and a load of 2.16 kg, and
the number of particles having an average particle size 0.15 times the number average particle size (Mn) of the ethylene-propylene copolymer particles is equal to or more than the number of the particles having the number average particle size (Mn).

3. A resin powder for three-dimensional molding, comprising ethylene-propylene copolymer particles, wherein
the volume average particle size of the ethylene-propylene copolymer particles is within a range of 5 to 200 µm,
the ethylene content molar ratio (ethylene/(ethylene+propylene)) in the ethylene-propylene copolymer particles is within a range of 0.001 to 0.04,
the melt flow rate (MFR) is within a range of 3 to 40 g/10 min at 230° C. and a load of 2.16 kg, and
the number of particles having an average particle size 0.41 times the number average particle size (Mn) of the ethylene-propylene copolymer particles is equal to or more than the number of the particles having the number average particle size (Mn).

4. A method for producing a three-dimensional molded article using a resin powder for three-dimensional molding, comprising
producing a three-dimensional molded article by a powder bed fusion method using the resin powder for three-dimensional molding according to claim 1.

5. The method for producing a three-dimensional molded article according to claim 4, comprising:
forming a thin layer of the resin powder for three-dimensional molding;
selectively irradiating the formed thin layer with laser light to form a molded article layer in which resin particles contained in the resin powder for three-dimensional molding are sintered or fused; and
carrying out the step of forming a thin layer and the step of forming a molded article layer, in this order, multiple times to stack the molded article layers.

* * * * *